United States Patent [19]
Miller et al.

[11] Patent Number: 5,360,256
[45] Date of Patent: Nov. 1, 1994

[54] RECLINER SEAT

[75] Inventors: Harold J. Miller, Mt. Clemens; Edward W. Clancy, III, Livonia, both of Mich.

[73] Assignee: General Motors Corporation, Detroit, Mich.

[21] Appl. No.: 51,953

[22] Filed: Apr. 26, 1993

[51] Int. Cl.$^5$ ............................................. B60N 2/20
[52] U.S. Cl. ................................................. 297/361.1
[58] Field of Search ............... 297/361.1, 362, 362.11, 297/362.12, 362.14

[56] References Cited

U.S. PATENT DOCUMENTS

| | | | |
|---|---|---|---|
| 1,770,826 | 7/1930 | Allgeyer | 297/362.14 |
| 2,016,119 | 10/1935 | Owler et al. | 155/163 |
| 2,596,760 | 5/1952 | Bryant | 297/362.14 |
| 3,046,055 | 7/1962 | Martens | 297/362.14 |
| 3,271,071 | 9/1966 | Tabor | 297/362.12 X |
| 3,321,243 | 5/1967 | Ferrara | 297/362.14 |
| 3,583,762 | 6/1971 | Strien | 297/362.14 X |
| 4,669,781 | 6/1987 | Conroy et al. | 297/362.14 |
| 4,759,587 | 7/1988 | Bucka | 297/362.11 X |

FOREIGN PATENT DOCUMENTS

| | | | |
|---|---|---|---|
| 0674930 | 2/1930 | France | 297/362.14 |
| 2231402 | 1/1974 | Germany | 297/362.14 |
| 3412139 | 10/1984 | Germany | 297/362.14 |
| 0483390 | 11/1954 | Italy | 297/362.14 |

Primary Examiner—Peter R. Brown
Assistant Examiner—Milton Nelson, Jr.
Attorney, Agent, or Firm—Ernest E. Helms

[57] ABSTRACT

A vehicle recliner seat is provided which, in a preferred embodiment, includes a seat pan frame, a seat back pivotally mounted with respect to the seat pan frame, a rod having at least one end locationally fixed with respect to the seat pan frame, a first link with a first end pivotally connected with the seat back with a second end pivotally connected with the rod, and a second link with a first end pivotally connected with the seat back with a second end pivotally connected with the rod. The position of the second ends of the first and second links on the rod can be moved to selectively set the inclination of the seat back with respect to the seat pan frame.

13 Claims, 3 Drawing Sheets

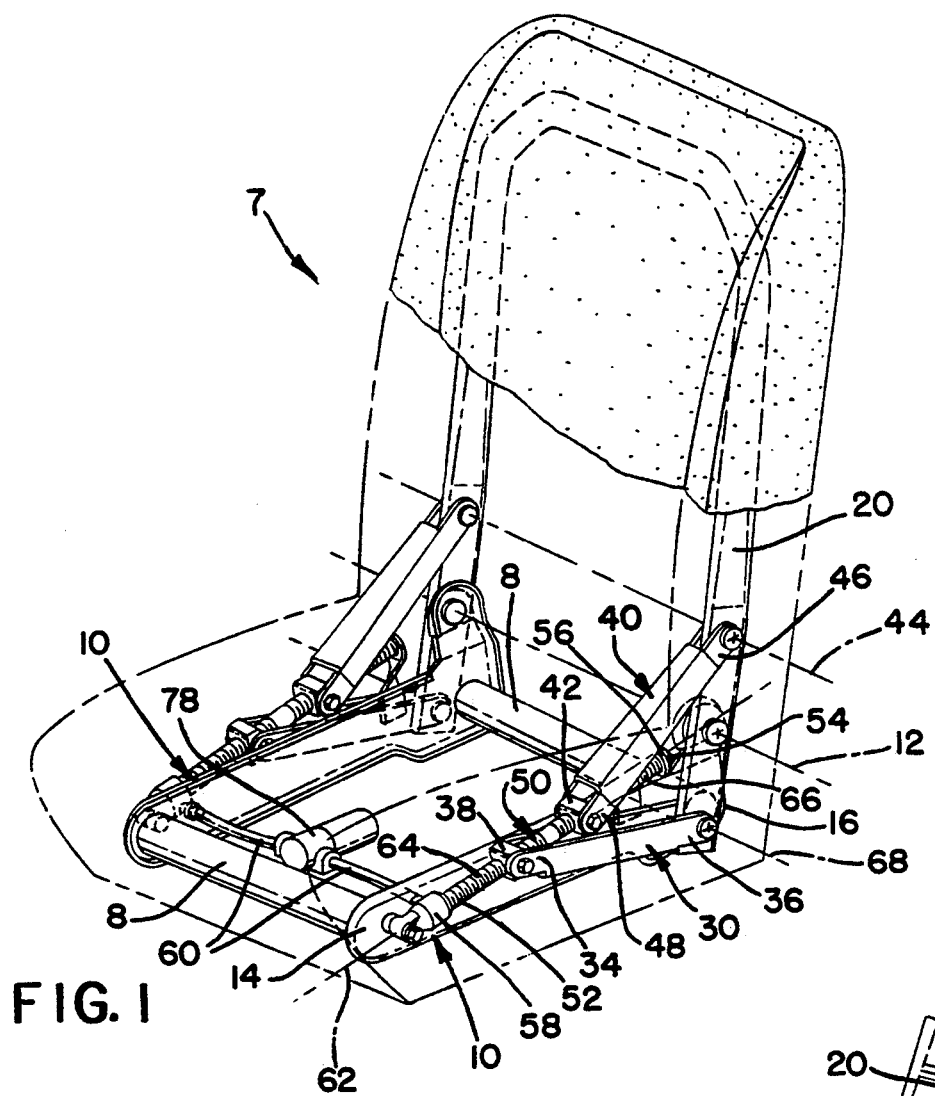
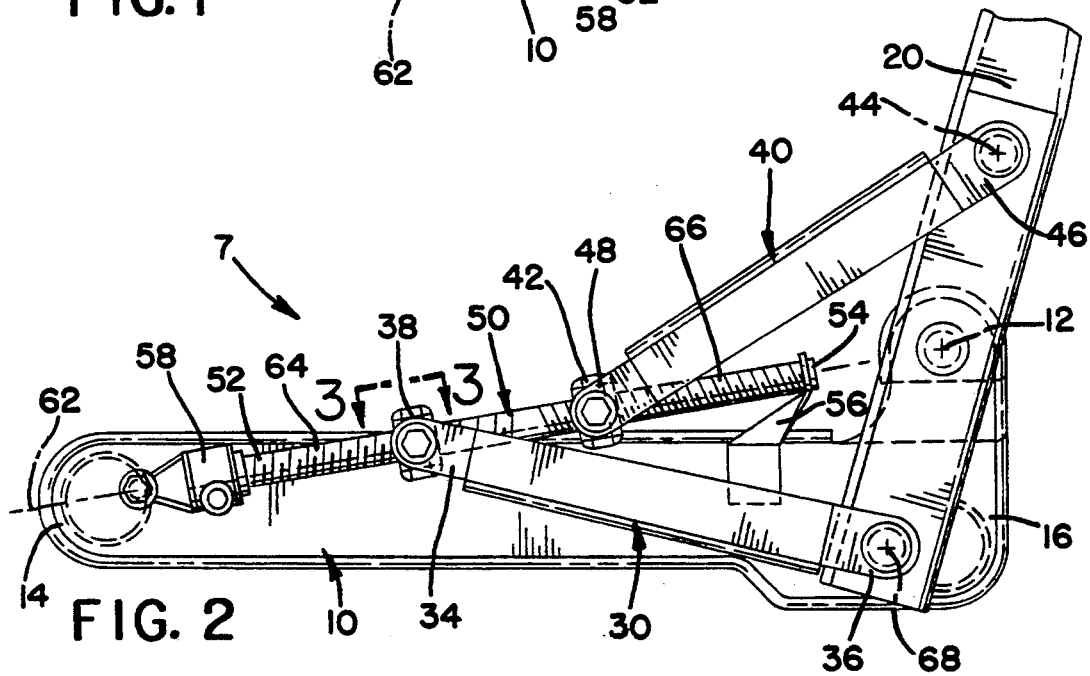

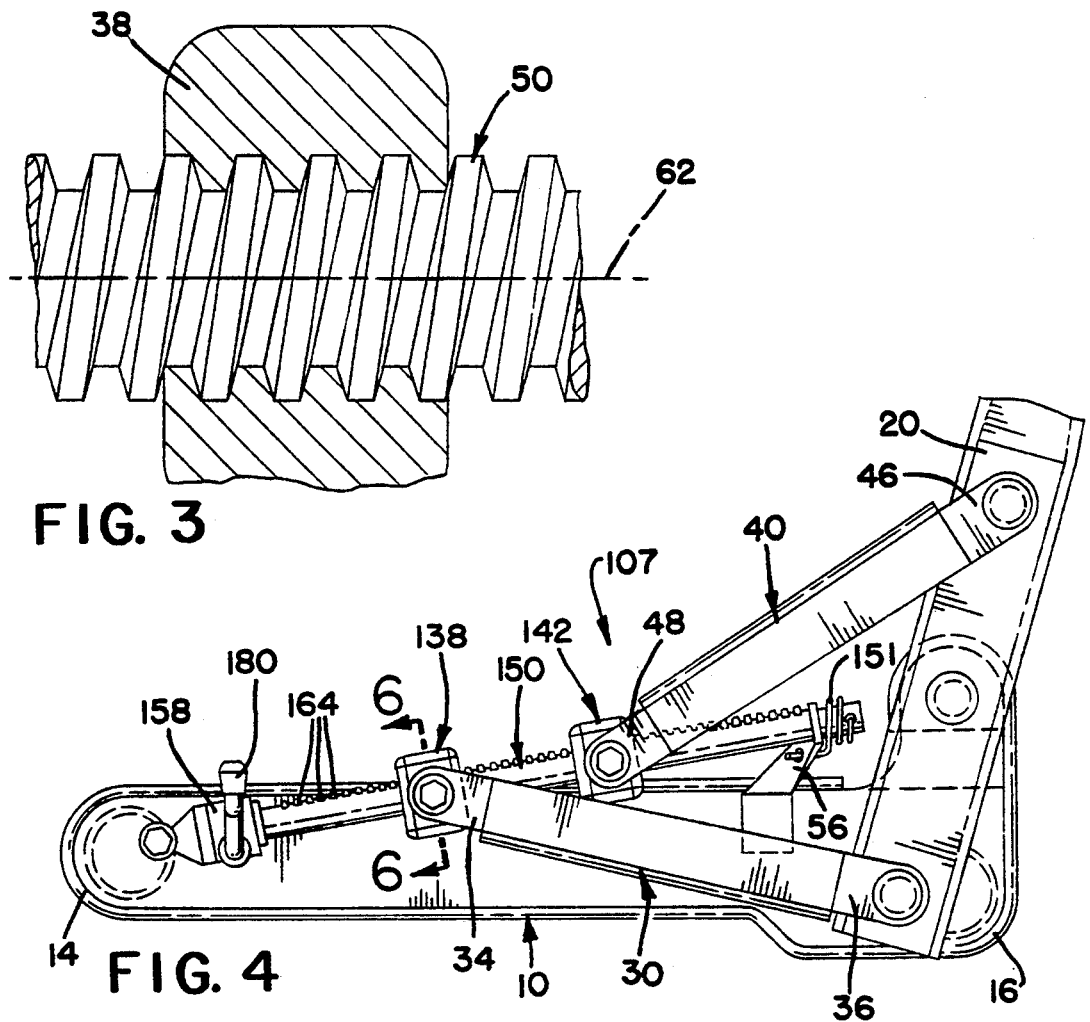
FIG. 3
FIG. 4
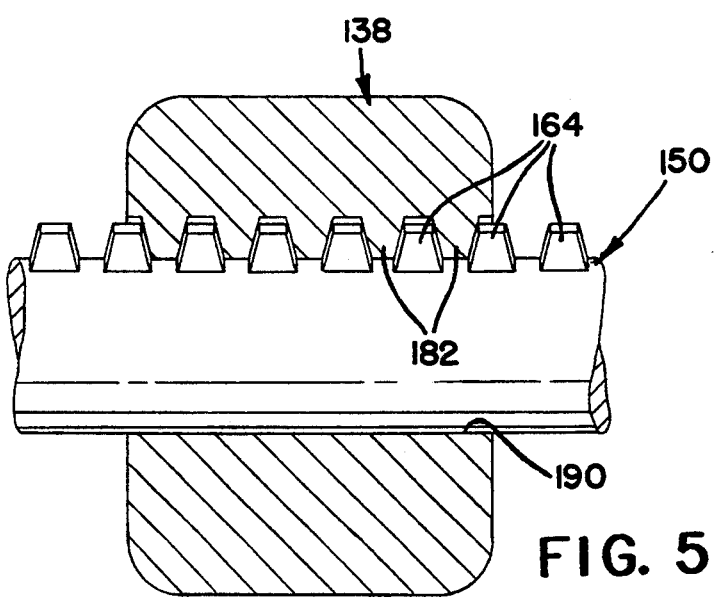
FIG. 5

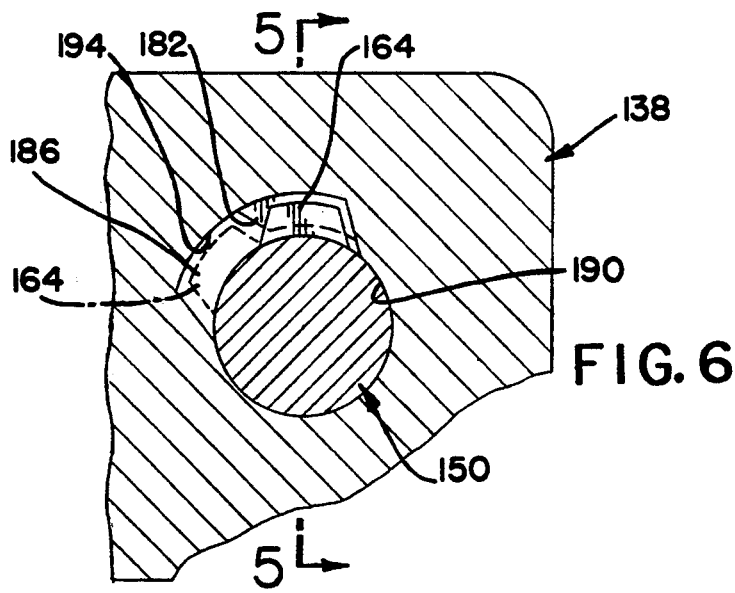
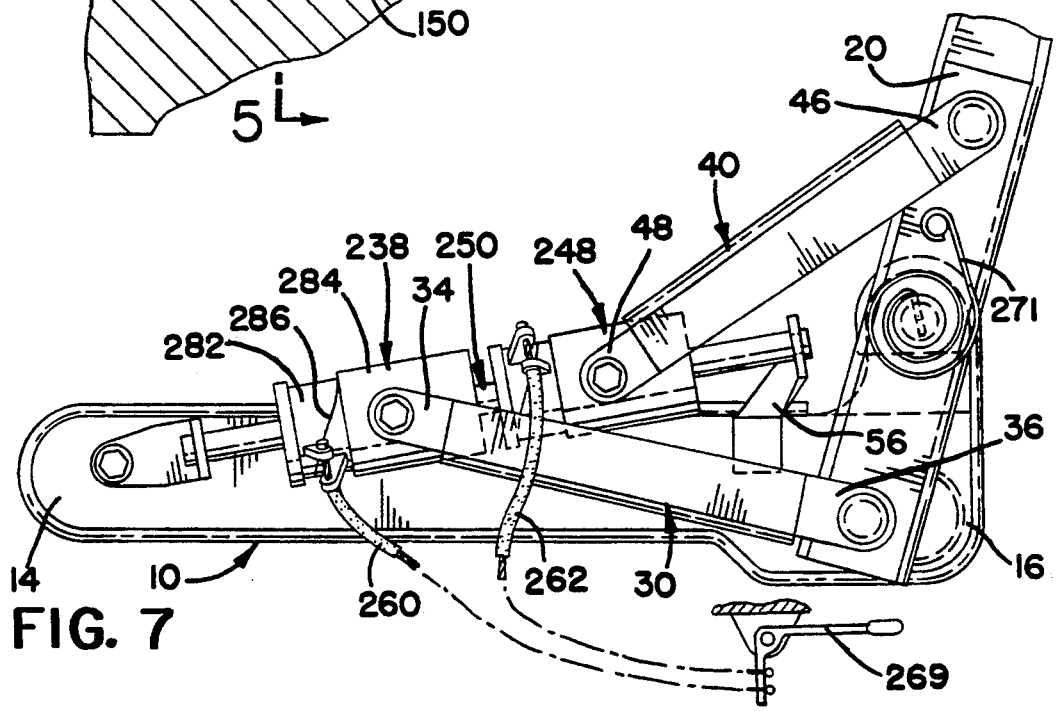
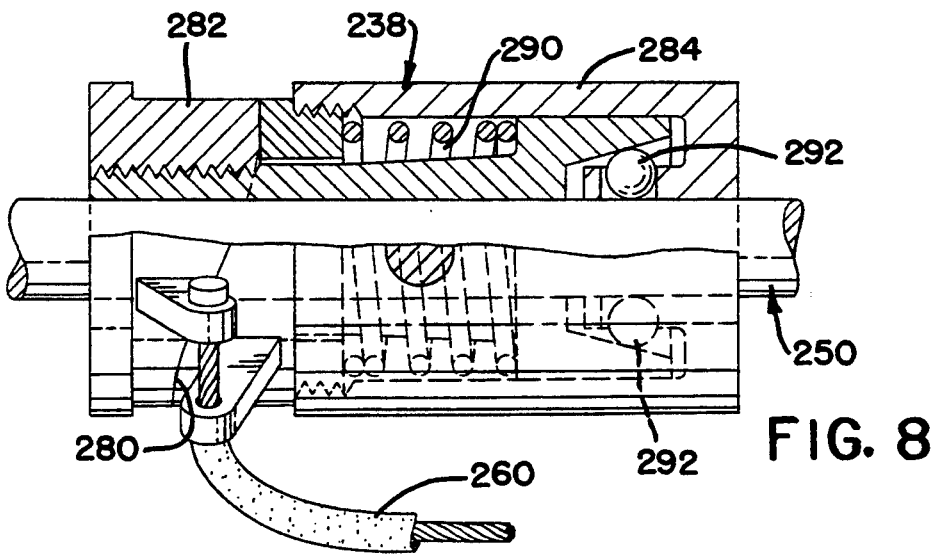

RECLINER SEAT

FIELD OF THE INVENTION

The field of the present invention is that of recliner seats for automotive-type vehicles.

BACKGROUND OF THE INVENTION

Reclining seats for automotive vehicles are well known in the art, examples of which Can be found in commonly-assigned U.S. Pat. No. 4,881,775 to Rees and U.S. Pat. No. 4,805,961 to Garrod. The present invention provides an alternate design to the recliners described in the aforementioned patents which further minimizes deflection forces experienced in the seat back frame during its utilization.

BRIEF DESCRIPTION OF THE DRAWINGS

FIG. 1 is a perspective view of the preferred embodiment of the present invention.

FIG. 2 is a side elevational view of the recliner seat shown in FIG. 1.

FIG. 3 is an enlarged view taken along line 3—3 of FIG. 2.

FIGS. 4 and 7 side elevational views of other preferred embodiments of the present invention.

FIGS. 5 and 6 are enlarged views taken along lines 5—5 of FIG. 6 and 6—6 of FIG. 4, respectively.

FIG. 8 is a partial section view of the linear lock shown in FIG. 7.

DESCRIPTION OF THE PREFERRED EMBODIMENT

Referring to FIGS. 1, 2 and 3, the inventive recliner seat of the present invention has two seat pan frame side panels 10 which are spaced apart in a parallel fashion. The two side panels are joined by connecting beams 8. The two separate sides of the seat 7 are generally symmetrical; therefore, only one side of the seat 7 will be described in detail.

The side panel 10 has a front end 14 and a rearward end 16. Pivotally connected with the side panel 10 along a pivotal axis 12 is a seat back frame 20. The seat back frame 20 is generally U-shaped and connects with both of the side panels 10.

Joined to the side panel 10 along its rotative axis 62 is an elongated member or threaded rod 50. The threaded rod is supported at its rearward end 54 by a stand 56 connected with the side panel 10. The front end 52 of the threaded rod 50 is connected with an actuator 58 which is driven by a drive cable 60 which is connected with a motor 78. A front portion of the rod 50 has a threaded portion 64 which is threaded at a right-hand pitch, having a pitch angle of approximately 76 degrees. The rearward portion 66 of the rod has a slightly different pitch angle but with a left-hand screw. If desired, the same pitch angle can be utilized on both threaded portions 64, 66.

Pivotally connected with the seat back 20 along its first end 36 about pivotal axis 68 is a first link 30. The first link 30 also has a second end 34 pivotally connected with a nut 38 which encircles the threaded portion 64 of the rod 50.

A second link 40 has a first end 46 having a pivotal axis 44 with the seat back 20. The second link 40 also has a second end 48 which is pivotally connected with a nut 42 which is in turn threadably engaged with threaded portion 66 of the rod 50. The pivotal axes 68, 12 and 44 are aligned with one another, and the pivotal axis 12 is juxtaposed between the axes 44 and 68.

The operation of the seat recliner is as follows. When it is desirable to have the seat recline, the actuator 58 (powered by the motor 78 via the cable 60) will rotate the rod 50 in a clockwise (looking in a forward direction) rotation, causing the nut 38 to move away from the seat back 20 and for the nut 42 to move toward the seat back 20. The above movement will cause the seat back 20 to be inclined rearwardly. To raise the seat again, the actuator 58 will be reversed. As mentioned previously, typically it has been found that for the limited range of inclination of the seat back 20, the pitch angles can be constant and can be the same but opposite hands. In some application, it may be found desirable to have differing pitch angles m maximize the kinetics of the operation.

It will be obvious to those skilled in the art that an elongated screw 50 along with first 30 and second 40 links can be provided for both sides of the seat 7 as shown in FIG. 1, if required. However, if strength requirements are lower, only one side of the seat will be required, first 30 and second 40 links and a rod 50.

Referring to FIGS. 4, 5 and 6, a manual embodiment of the present invention recliner seat 107 is shown with items performing similar functions shown in FIGS. 1 through 3 being given like numbers. A rod 150 is manually rotated by a lever 180 which is gearably engaged with an actuator 158 which transfers torque to the rod 150. The rod 150 has a series of teeth 164. The rod teeth 164 engage with a series of internal teeth 182 formed within a bore 190 of a nut 138 pivotally connected with the first link 30. Most of the bore 190 closely follows the diameter of rod 150 except that there is a radially enlarged portion 194 which accommodates the internal teeth 182 and the rod teeth 164.

The rod 150 is torsionally biased by a torsion spring 151 to assume a position as shown in FIG. 6 to lock the position of the nut 138 (and, in a similar fashion, nut 142) on the rod 150. To change the position of the seat, the handle 180 is pulled upon and the rod 150 is positioned to place the rod teeth 164 in the position 186 shown in phantom to allow the inclination of the seat to be adjusted. To lock the seat back 20 in position, the handle 180 is released. If a rod 150 is utilized on both sides of the seat 107, a common pull cable can be used to provide a torque input to the actuators 158.

Referring to FIGS. 7 and 8, a second manual embodiment of the present invention is shown with those items performing similar functions shown in FIGS. 1, 2 and 3 being given like numbers. An elongated rod 250 does not have a threaded portion; instead, at the second ends 34, 48 of the first and second links 30, 40, there are connected linear locks 238, 248. The linear locks may be released by rotation of a hand lever 269 connected with cables 260, 262 to allow the seat to be pushed rearwardly or forwardly by movement of the seat occupant or by a biasing spring 271. The linear locks have a cap threadably joined to a cam head which is biased by a spring 290 against a ball 292. The cap has a cam curvilinear surface 280 with a holding frame 284. A pull on cable 260 will cause the cam head 282 to be pulled away from the balls 292, thereby allowing free movement of the linear lock on the rod 250. A release of the tension force on the cable 260 will allow the linear lock to again affix itself to the rod 250, thereby setting the inclination of the seat back 20.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle recliner seat comprising:
   a seat pan frame;
   a seat back pivotally mounted with respect to the seat pan frame;
   an elongated member having at least one end locationally fixed with respect to the seat pan frame;
   a first link with a first end pivotally connected with the seat back with a second end pivotally connected with the elongated member;
   a second link with a first end pivotally connected with the seat back with a second end pivotally connected with the elongated member; and
   means to selectively connect the second ends of the first and second links on the elongated member to set the inclination of the seat back with respect to the seat pan frame.

2. A recliner seat as described in claim 1 wherein the seat back has a fixed pivotal axis with the pan frame and the pivotal axis of the seat back with the pan frame is juxtaposed between fixed pivotal axes of the second and first links with the seat back and the pivotal axis of the first link with the seat back is in a lower position than the pivotal axis of the second link with the seat back.

3. A recliner seat as described in claim 1 wherein the elongated member has an elongated axis which projects through a pivotal axis of the seat back to the pan frame.

4. A recliner seat as described in claim 1 wherein the elongated member is connected with the pan frame.

5. A recliner seat as described in claim 4 wherein the elongated member is supported on the pan frame at two spaced ends.

6. A recliner seat as described in claim 1 wherein the elongated member is threaded and the second ends of the first and second links are threadably engaged with the threads of the elongated member.

7. A recliner seat as described in claim 6 wherein the threads of the elongated member which are mated with the second ends of the first and second links are opposite hands from one another.

8. A recliner seat as described in claim 6 wherein the thread which engages with the first end of the first link has a different pitch angle than the thread which is engaged with the second end of the first link.

9. A recliner seat as described in claim 6 wherein the elongated member has an elongation axis and is powered for rotation along its elongated axis.

10. A recliner seat as described in claim 1 further having manually actuated means to selectively position the second end of the first and second links on the elongated member.

11. A recliner seat as described in claim 10 wherein the second ends of the first and second links have engaging linear locks which can be released manually by a pull on a tensioned releasing mechanism.

12. A recliner seat as described in claim 10 having a partially threaded rod elongated member engaged with the second end of the first and second links and wherein rotation of the threaded rod elongated member causes the second ends of the first and second links to move freely on the threaded rod elongated member.

13. A vehicle recliner seat comprising:
   a seat pan frame;
   a seat back having a fixed pivotal axis with the seat pan frame;
   a threaded rod having threads of a first hand on one side and threads of an opposite hand on a second side, the rod being locationally fixed with respect to the seat pan frame, the rod having an elongated axis being mounted for rotation with respect to the seat pan frame and being connected thereto and projecting toward the pivotal axis between the seat back and the seat pan frame;
   a first link with a first end pivotally mounted with the seat back with a second end pivotally connected and threaded with the elongated member, said first link having a pivotal axis with the seat back below the pivotal axis of the seat back with the seat pan frame;
   a second link with a first end pivotally connected with the seat back above the pivotal connection of the seat back with the seat pan frame and the second link having a second end pivotally connected and threaded with the elongated rod; and
   means to selectively rotate the elongated rod to set the inclination of the seat back with respect to the seat pan frame.

* * * * *